United States Patent
Yasuhara et al.

(10) Patent No.: US 12,043,764 B2
(45) Date of Patent: Jul. 23, 2024

(54) CATIONIC ELECTRODEPOSITION COATING COMPOSITION AND METHOD FOR ELECTRODEPOSITION COATING

(71) Applicant: KANSAI PAINT CO., LTD., Amagasaki (JP)

(72) Inventors: Makoto Yasuhara, Hiratsuka (JP); Mutsumi Ogasawara, Hiratsuka (JP); Takahiro Hidaka, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 777 days.

(21) Appl. No.: 16/641,055

(22) PCT Filed: Aug. 21, 2018

(86) PCT No.: PCT/JP2018/030808
§ 371 (c)(1),
(2) Date: Feb. 21, 2020

(87) PCT Pub. No.: WO2019/039467
PCT Pub. Date: Feb. 28, 2019

(65) Prior Publication Data
US 2020/0283647 A1    Sep. 10, 2020

(30) Foreign Application Priority Data

Aug. 23, 2017 (JP) ................... 2017-160451

(51) Int. Cl.
| | | |
|---|---|---|
| *C09D 5/44* | (2006.01) |
| *C09D 5/02* | (2006.01) |
| *C09D 7/63* | (2018.01) |
| *C09D 133/08* | (2006.01) |
| *C09D 163/10* | (2006.01) |
| *C25D 13/00* | (2006.01) |
| *C08K 3/04* | (2006.01) |
| *C08K 3/22* | (2006.01) |

(52) U.S. Cl.
CPC .......... *C09D 5/4457* (2013.01); *C09D 5/028* (2013.01); *C09D 5/4411* (2013.01); *C09D 5/4496* (2013.01); *C09D 7/63* (2018.01); *C09D 133/08* (2013.01); *C09D 163/10* (2013.01); *C25D 13/00* (2013.01); *C08K 3/04* (2013.01); *C08K 2003/2237* (2013.01)

(58) Field of Classification Search
CPC .... C09D 5/4457; C09D 5/028; C09D 5/4411; C09D 5/4496; C09D 7/63; C09D 133/08; C09D 163/10; C09D 5/44; C09D 201/02; C25D 13/00; C25D 13/22; C08K 3/04; C08K 2003/2237; B01J 13/125
See application file for complete search history.

(56) References Cited

U.S. PATENT DOCUMENTS

| | | |
|---|---|---|
| 3,984,299 A | 10/1976 | Jerabek |
| 4,017,438 A | 4/1977 | Jerabek et al. |
| 5,109,040 A | 4/1992 | Hönig et al. |
| 5,124,399 A | 6/1992 | Yabuta et al. |
| 5,643,977 A | 7/1997 | Sho et al. |
| 2002/0027077 A1* | 3/2002 | Sakamoto ............... C09D 5/44 204/493 |
| 2005/0282936 A1 | 12/2005 | Toi et al. |
| 2006/0078742 A1 | 4/2006 | Kauffman et al. |
| 2007/0173602 A1 | 7/2007 | Brinkman et al. |
| 2014/0235785 A1 | 8/2014 | Brinkhuis et al. |
| 2016/0060389 A1 | 3/2016 | Brinkhuis et al. |

FOREIGN PATENT DOCUMENTS

| | | |
|---|---|---|
| EP | 1 593 727 A1 | 11/2005 |
| GB | 2 220 661 A | 1/1990 |
| JP | 59-43013 A | 3/1984 |
| JP | 2-84469 A | 3/1990 |
| JP | 4-39322 A | 2/1992 |
| JP | 7-300698 A | 11/1995 |
| JP | 8-245751 A | 9/1996 |
| JP | 8-337750 A | 12/1996 |
| JP | 10-25437 A | 1/1998 |
| JP | 10-120947 A | 5/1998 |
| JP | 10-195349 A | 7/1998 |
| JP | 10-330690 A | 12/1998 |
| JP | 11-315145 A | 11/1999 |
| JP | 2004-27255 A | 1/2004 |
| JP | 2005-320538 A | 11/2005 |
| JP | 2006-111880 A | 4/2006 |

(Continued)

OTHER PUBLICATIONS

Chinese Office Action and Search Report, dated Jun. 29, 2021, for Chinese Application No. 201880054470.2, with an English translation of the Chinese Office Action.
Indian Office Action for Indian Application No. 202017010939, dated Apr. 8, 2021, with English translation.
Chinese Office Action and Search Report for corresponding Chinese Application No. 201880054470.2, dated Sep. 2, 2022, with English translation.

(Continued)

*Primary Examiner* — Cephia D Toomer
(74) *Attorney, Agent, or Firm* — Birch, Stewart, Kolasch & Birch, LLP

(57) ABSTRACT

The present disclosure is a cationic electrodeposition coating composition comprising an emulsion particle (A) containing a Michael addition reaction donor component and an emulsion particle (B) containing a Michael addition reaction acceptor component wherein a Michael addition reaction catalyst (C) is contained in the emulsion particle (A) or the emulsion particle (B) or is contained in the cationic electrodeposition coating composition by being microencapsulated.

15 Claims, No Drawings

(56) References Cited

FOREIGN PATENT DOCUMENTS

| | | | |
|---|---|---|---|
| JP | 2007-217686 A | 8/2007 | |
| JP | 2009-91594 A | 4/2009 | |
| JP | 2014-529001 A | 10/2014 | |
| JP | 2016-514760 A | 5/2016 | |
| WO | WO 2013/192480 A2 | 12/2013 | |
| WO | WO2018024674 | * | 2/2018 |

OTHER PUBLICATIONS

Extended European Search Report for European Application No. 18848340.8. dated Apr. 30, 2021.
International Search Report, issued in PCT/JP2018/030808, dated Nov. 6, 2018.

* cited by examiner

CATIONIC ELECTRODEPOSITION COATING COMPOSITION AND METHOD FOR ELECTRODEPOSITION COATING

TECHNICAL FIELD

The present disclosure is related to cationic electrodeposition coating compositions and electrodeposition coating methods.

BACKGROUND ART

Cationic electrodeposition coating compositions have excellent application workability and form coating films with superior corrosion resistance. They have thus been widely used for, for example, automobile parts, electrical equipment parts, and other industrial machinery, which are required to have such properties.

In general, cationic electrodeposition coating compositions are provided in the form of a mixture of two components, i.e., a resin emulsion component in which resin components comprising a cationic resin (e.g., an amino group-containing epoxy resin) and a curing agent (also called "crosslinking agent"; e.g., a blocked polyisocyanate compound) are mixed and dispersed in an aqueous medium, and a pigment dispersion paste component containing a pigment dispersed with a resin for pigment dispersion. Such a coating composition is used as a coating bath, and a current is applied using a substrate as a cathode and the counter electrode as anode to form a deposited coating film on the substrate. The deposited coating film is heated to form a crosslink-cured coating film.

The aforementioned heating during coating is usually performed at a temperature higher than 160° C., but to reduce energy costs, it is becoming desired for the heating to be performed at a low temperature (0 to 130° C., preferably 5 to 100° C., more preferably 10 to 80° C.). This is called "low-temperature baking".

The low-temperature baking is commonly performed using a low-temperature curable blocked polyisocyanate compound as a curing agent. For example, Patent Document 1 discloses that low-temperature curing is performed using an oxime-blocked isocyanate-containing cationic electrodeposition coating composition. Patent Document 2 discloses a low-temperature-baking electrodeposition coating composition that is baked at a temperature of 100 to 160° C. and that oxime-blocked and lactam-blocked polyisocyanate compounds can dissociate (reaction) at relatively low temperature. Patent Document 3 discloses that a self-crosslinking resin containing a specific blocked isocyanate group can be cured at a low temperature of 120° C. or less and can also be used as a cationic electrodeposition coating composition.

Furthermore, Patent Document 4 discloses a method for forming a coating film by low-temperature baking, comprising performing electrodeposition coating using a base resin (an amine-added epoxy resin), performing electrodeposition coating using an aqueous dispersion of a blocked polyisocyanate curing agent to which water dispersibility is imparted, and drying the resulting coating film by heating at 60 to 150° C.

BACKGROUND ART DOCUMENTS

Patent Documents

Patent Document 1
Japanese Unexamined Patent Application Publication No. H10(1998)-120947
Patent Document 2
Japanese Unexamined Patent Application Publication No. H7(1995)-300698
Patent Document 3
Japanese Unexamined Patent Application Publication No. H4(1992)-39322
Patent Document 4
Japanese Unexamined Patent Application Publication No. 2004-27255

SUMMARY OF THE DISCLOSURE

Technical Problem

However, there are cases in which the long-term storage stability (bath stability) is insufficient in the electrodeposition coating composition with a high reactivity at low temperatures as described in Patent Documents 1 to 3 above, resulting in, for example, poor finished appearance and corrosion resistance of the coating film. In addition, in the coating method described in Patent Document 4 above, since coating compositions and coating are separately used for the base resin and the curing agent, the storage stability (bath stability) of the coating compositions is improved. However, the curing agent may not be homogeneously present in the coating film, resulting in, for example, poor corrosion resistance. Further, since this method requires additional coating and washing steps, existing equipment cannot be used, and it is necessary to provide additional equipment.

The present disclosure has been developed in view of the foregoing circumstances. The present disclosure provides a cationic electrodeposition coating composition which is superior in storage stability, low-temperature curability and finished appearance.

Solution to the Problem

The present inventors conducted extensive research to achieve a cationic electrodeposition coating composition which is superior in storage stability, low-temperature curability and finished appearance, and found that such a cationic electrodeposition coating composition can be achieved by cationic electrodeposition coating compositions containing emulsion particles (A) containing a Michael addition reaction donor component, emulsion particles (B) containing a Michael addition reaction accepter component and a Michael addition reaction catalyst (C), wherein the Michael addition reaction catalyst (C) is included in the emulsion particles (A) or the emulsion particles (B), or included in the cationic electrodeposition coating composition by being microencapsulated. The present invention has been thus accomplished.

In other words, the cationic electrodeposition coating composition and the method for electrodeposition coating of the present disclosure have the following constitutions respectively.

Item 1. A cationic electrodeposition coating composition comprises an emulsion particle (A) containing a Michael addition reaction donor component, an emulsion particle (B)

containing a Michael addition reaction acceptor component, and a Michael addition reaction catalyst (C), wherein the Michael addition reaction catalyst (C) is contained in the emulsion particle (A) or the emulsion particle (B), or is contained in the cationic electrodeposition coating compositions by being microencapsulated.

Item 2. The cationic electrodeposition coating composition according to Item 1, wherein the Michel addition reaction donor component of the emulsion particle (A) is at least one active hydroxy group-containing compound (A-1) selected from the group consisting of an active methylene group-containing compound, a primary and/or secondary amine group-containing compound, a thiol group (mercapto group) containing compound, and a hydrogen group-containing compound.

Item 3. The cationic electrodeposition coating composition according to Item 1, wherein the Michael addition reaction donor component of the emulsion particle (A) is a compound having an active methylene group, and wherein the compound having the active methylene group is at least one compound selected from the group consisting of a malonic acid compound, an acetoacetic acid compound, an isobutyrylacetic acid compound, a benzoylacetic acid compound, and a propionylacetic acid compound.

Item 4. The cationic electrodeposition coating composition according to any one of Items 1 to 3, wherein the Michael addition reaction donor component of the emulsion particle (B) is at least one compound (B-1) having an α,β-unsaturated carbonyl group selected from the group consisting of a (meth) acryloyloxy group-containing compound, a (meth) acrylamide group-containing compound, a maleic acid compound, a fumaric acid compounds, and an itaconic acid compound.

Item 5. The cationic electrodeposition coating composition according to any one of Items 1 to 4, wherein the Michael addition reaction catalyst (C) is at least one basic catalyst selected from the group consisting of an alkali metal hydroxide, an alkali metal carbonate, a quaternary ammonium compound, a tertiary ammonium compound, a guanidine compound, an amidine compound, a tertiary phosphine compound, a phosphazene compound, a tertiary sulfonium compound, a quaternary phosphonium compound, and an imidazole compound.

Item 6. The cationic electrodeposition coating composition according to any one of Items 1 to 5, wherein the basic catalyst has a molecular weight of 200 or more.

Item 7. The cationic electroporation coating composition according to any one of Items 1 to 6, wherein when the cationic electrodeposition coating composition is centrifuged under the following conditions to separate into a solid component and a solvent component, the content of the Michael addition reaction catalyst (C) contained in the solvent component is 30% by mass or less based on a blending quantity of the Michael addition reaction catalyst (C) in the cationic electrodeposition coating composition.
<Centrifugation Conditions>
The cationic electrodeposition composition is centrifuged at 25° C. and a relative centrifugal acceleration of $3.5 \times 10^4$ G for 5 hours.

Item 8. The cationic electrodeposition coating composition according to any one of Items 1 to 7, wherein a pigment is included in at least one of the emulsion particle (A) containing the Michael addition reaction donor component and the emulsion particle (B) containing the Michael addition reaction acceptor component.

Item 9. The cationic electrodeposition coating composition, wherein one of the compound containing the active hydrogen group (A-1) and the compound having α,β-unsaturated carbonyl group (B-1) is an epoxy resin having a weight-average molecular weight of 1,800 or more, and the other is a compound having a weight-average molecular weight of less than 1,800.

Item 10. The cationic electrocoat composition according to any one of Items 1 to 9, wherein the Michael addition reaction catalyst (C) is a microencapsulated catalyst.

Item 11. The cationic electrodeposition coating composition according to any one of Items 1 to 9, wherein the Michael addition reaction catalyst (C) is a temperature sensitive microencapsulated catalyst and elutes at a temperature between 30° C. and 130° C.

Item 12. A method for electrodeposition coating comprising: immersing a metal substrate in an electrodeposition coating bath to electrodeposit on the substrate by using the cationic electrodeposition coating composition according to any one of Items 1 to 11 as the electrodeposition coating bath.

Item 13. A method for electrodeposition coating comprising: immersing a metal substrate in an electrodeposition coating bath by using the cationic electrodeposition coating composition according to any one of Items 1 to 11 as the electrodeposition coating bath, and curing at a temperature of 130° C. or less after conducting electrodeposition coating.

Item 14. A method for electrodeposition coating comprising: immersing a metal substrate in an electrodeposition coating bath by using the cationic electrodeposition coating composition according to any one of claims 1 to 11 as the electrodeposition coating bath; and curing by electromagnetic induction heating after conducting electrodeposition coating.

Advantageous Effects of the Disclosure

The cationic electrolytic coating composition of the present disclosure is superior in curability, finished appearance, and corrosion resistance, even if cured at an ordinary temperature or a low temperature, while ensuring good coating stability (bath stability).

Specifically, automobile bodies coated with the cationic electrodeposition coating compositions of the present disclosure have superior coating finished appearance and less corrosion or deterioration, even when the car is driven for a long period of time in an environment which snow-melting salts have been spread. Moreover, the cationic electrodeposition coating compositions of the present disclosure also have superior storage stability over a long period of time.

DESCRIPTION OF EMBODIMENTS

[Cationic Electrodeposition Coating Composition]

A cationic electrodeposition coating composition comprises emulsion particles (A) containing a Michael addition reaction donor component, emulsion particles (B) containing a Michael addition reaction acceptor component, and a Michael addition reaction catalyst (C) wherein the Michael addition reaction catalyst (C) is contained in the emulsion particles (A) or the emulsion particles (B) or is contained in the cationic electrodeposition coating composition by being microencapsulated.

The cationic electrolytic coating composition is a coating composition that is curable at low temperatures, primarily by the Michael addition reaction. The Michael addition reaction is not intended to be limited by any particular theories, and is taught, for example, in Organic Chemistry by RT Morrison and RN Boyd, Third Edition, Allyn and Bacon, 1973. This reaction is believed to occur between the Michael donor and Michael acceptor components in the presence of a catalyst.

The cationic electrodeposition coating composition of the present disclosure can improve storage stability (bath stability) since the emulsion particle (A) as a donor component of the Michael addition reaction, and emulsion particle (B) as an acceptor component of the Michael addition reaction are present separately in the coating composition (in an aqueous solvent). In particular, the cationic electrodeposition coating is effective for the storage stability of one-component type low-temperature baking coating (or one-component type room-temperature baking coating) that undergoes the curing reaction at 0 to 130° C. (preferably at 5 to 100° C., more preferably at 10 to 80° C.).

In the present disclosure, "aqueous solvent" means a solvent whose main component is at least one of water and a hydrophilic solvent. Examples of hydrophilic solvents include ethylene glycol, ethylene glycol monoalkyl ether (e.g., methyl ether, ethyl ether, butyl ether, etc.), diethylene glycol, diethylene glycol monoalkyl ether (e.g., methyl ether, ethyl ether, butyl ether, etc.), glyme-based solvents (e.g., ethylene glycol dimethyl ether, etc.), diglyme-based solvents (e.g., diethylene glycol dimethyl ether, etc.), alcohol-based solvents (e.g., methyl alcohol, ethyl alcohol, propyl alcohol, n-butyl alcohol, etc.), propylene glycol, propylene glycol monoalkyl ether (e.g., methyl ether, ethyl ether, butyl ether, etc.), dipropylene glycol, dipropylene glycol monoalkyl ether (e.g., methyl ether, ethyl ether, butyl ether, etc.), These hydrophilic solvents may be used alone or in combinations of more than two species.

In the present disclosure, "compound" is a generic name including monomers, oligomers, polymers (resins), etc.

In the present disclosure, "emulsion particle" is a particle in which a compound is dispersed in a solvent, and causes turbidity rather than transparency.

The present disclosure will be described in detail below.
(Emulsion Particle (A) Containing Michael Addition Reaction Donor Components)

The emulsion particle (A) containing Michel addition reaction donor component is an emulsion particle containing at least one of active hydrogen group-containing compound (A-1) selected from the group consisting of an active methylene group-containing compound, a primary and/or secondary amine group-containing compound, a thiol group (mercapto group) containing compound, and a hydrogen group-containing compound. Among these, the active hydrogen group-containing compound (A-1) is preferably at least one of the active methylene group-containing compound and the primary and/or secondary amino group-containing compound.

The active hydrogen group-containing compound (A-1) is not specifically limited. For example, active methylene group-containing compounds such as methyl acetoacetate, ethyl acetoacetate, t-butyl acetoacetate, 2-ethylhexyl acetoacetate, lauryl acetoacetate, acetoacetanilide, 2-acetoacetoxy ethyl methacrylate, allyl acetoacetate, butanediol diacetoacetate, 1,6-hexanediol diacetoacetate, neopentyl glycol diacetoacetate, cyclohexanedimethanol diacetoacetate, ethoxylated bisphenol A diacetoacetate, trimethylolpropan triacetoacetate, glycine triacetoacetate, polycaprolactone triacetoacetate, pentaerythritol tetraacetoacetate and the like; primary and/or secondary amino group-containing compounds such as ethylenediamine, diethylenetriamine, dipropylenetriamine, triethylenetetramine, tripropylenetetramine, tetraethylenepentamine tetrapropylenepentamine and the like; thiol group (mercapto group) containing compounds such as pentaerythritol tetrakis (3-mercaptopropionate), trimethylolpropane tris (3-mercaptopropionate), tris-[(3-mercaptopropionyloxy)-ethyl]-isocyanurate, tetraethylene glycol bis (3-mercaptopropionate), dipentaerythritol hexakis (3-mercaptopropionate), pentaerythritol tetrakis (3-mercaptobutyrate), trimethylolpropane tris (3-mercaptobutyrate) and the like; hydroxy group-containing compounds such as alkanediol, poly (oxyalkylene) glycol, glycerol, diglycerol, trimethylolpropane, ditrimethylolpropane, pentaerythritol, dipentaerythritol, and the like; or reaction products of these may be employed as the active hydrogen group-containing compound (A-1). These may be used alone or in combinations of more than two species.

As the active hydrogen group-containing compound (A-1) described above, a compound whose skeleton is a resin can also be favorably used. Specific examples include (Example 1) to (Example 5) below.

(Example 1) An acrylic resin obtained by copolymerizing an active hydrogen group-containing acrylic monomer with another acrylic monomer. Examples of the active hydrogen group-containing acrylic monomer include 2-ethoxymalonyloxyethyl (meth)acrylate, 2-acetoacetoxyethyl (meth)acrylate, 2-cyanoacetoxyethyl (meth)acrylate, N-(2-cyanoacetoxyethyl)acrylamide, N-(2-propionylacetoxybutyl) acrylamide, N-(4-acetoacetoxymethylbenzyl)acrylamide, N-(2-acetoacetylaminoethyl) acrylamide, and 2-(N-acetoacetylaminoethyl) (meth)acrylate, 2-hydroxyethyl (meth) acrylate, 2-hydroxypropyl (meth)acrylate, 3-hydroxypropyl (meth)acrylate, 4-hydroxybutyl (meth)acrylate, N-hydroxymethyl (meth)acrylamide, and (meth)acrylate having a polyoxyalkylene chain whose molecular end is a hydroxy group, and the like.

(Example 2) A polyester resin obtained by polycondensation of a dicarboxylic acid compound including malonic acid and a diol compound.

(Example 3) An epoxy resin obtained by addition condensation of a dicarboxylic acid compound containing malonic acid and a diglycidyl compound.

(Example 4) A polyamide resin obtained by polycondensation of a dicarboxylic acid compound containing malonic acid and a diamine compound.

(Example 5) A resin obtained by adding an active hydrogen group-containing compound to resins (e.g., acrylic resin, epoxy resin, polyester resin, urethane resin, phenolic resin, etc.). Among these resins, active hydrogen group-containing epoxy resins and/or active hydrogen group-containing acrylic resins are preferred, and the active hydrogen group-containing epoxy resins are more preferred.

The epoxy resin used for the formation of the active hydrogen group-containing epoxy resin described above (Example 5) is a resin having at least one epoxy group, preferably two or more, in one molecule, as well as having a number average molecular weight of at least 300, preferably 400 to 4,000, more preferably 800 to 2,500, and an epoxy equivalent of at least 160, preferably 180 to 2,500, and more preferably 400 to 1,500. As such an epoxy resin, for example, that resulting from the reaction of a polyphenolic compound with epihalohydrin (e.g., epichlorohydrin, etc.) can be used.

The polyphenolic compound includes, for example, bis (4-hydroxyphenyl)-2,2-propane [bisphenol A], bis (4-hydroxyphenyl) methane [bisphenol F], bis (4-hydroxycyclohexyl) methane [hydrogenated bisphenol F], 2,2-bis (4-hydroxycyclohexyl) propane [hydrogenated bisphenol A], 4,4'-dihydroxybenzophenone, bis (4-hydroxyphenyl)-1,1-ethane, bis (4-hydroxyphenyl)-1,1-isobutane, bis (4-hydroxy-3-tert-butyl-phenyl)-2,2-propane, bis (2-hydroxynaphthyl) methane, tetra (4-hydroxyphenyl)-1,1,2,2-ethane, 4,4'-dihydroxydiphenyl sulfone, phenol novolac, and cresol novolac.

In addition, the epoxy resin obtained by a reaction between a polyphenol compound and epihalohydrin is preferably a resin represented by the following formula which is derived from bisphenol A.

[Chemical 1]

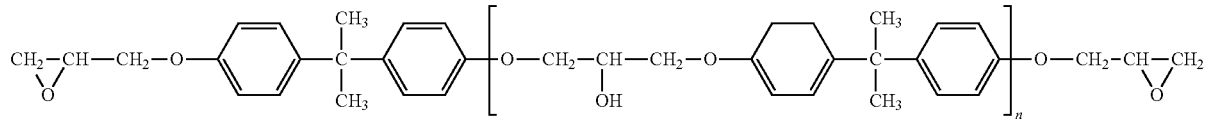

Here, 0 to 8 is a preferable range for n.

Examples of commercially available products of the epoxy resin include products sold under the trade names of jER828EL, jER1002, jER1004, and jER1007 by Mitsubishi Chemical Corporation.

In addition, as the above active hydrogen group-containing epoxy resin, an epoxy resin containing polyalkylene oxide chains in the resin skeleton can be used. Generally, such epoxy resins can be obtained by reacting an epoxy resin having at least one (a) epoxy group, preferably two or more, with an alkylene oxide or a polyalkylene oxide to introduce a polyalkylene oxide chain, or (β) reacting a polyphenolic compound with a polyalkylene oxide having at least one, preferably two or more epoxy groups to introduce a polyalkylene oxide chain. Alternatively, epoxy resins already containing polyalkylene oxide chains may be used. (See, for example, JP H08-337750A)

The alkylene group in the polyalkylene oxide chain is preferably $C_{2-8}$ alkylene, more preferably an ethylene group, a propylene group, or a butylene group, and particularly preferably a propylene group.

As the epoxy resin other than the bisphenol type epoxy resin, t-butylcatechol type epoxy resin, phenol novolac type epoxy resin, cresol novolac type epoxy resin can also be suitably used, and one or two or more species of these can be used alone or in combination. Commercial products of novolac type epoxy resins include, for example, the DEN-438 of phenol novolac resins manufactured by Dow Chemical Co., Ltd., and the YDCN-703 of cresol novolac resins manufactured by Toto Kasei Co., Ltd.

In addition, as the active hydrogen group-containing epoxy resin described above, those having at least one of primary amino groups, secondary amino groups, and tertiary amino groups are preferable from the viewpoint of coating properties of the cationic electrodeposition coating. Here, in the case of primary and/or secondary amino groups, an effect as a donor component of the Michael addition reaction can be exhibited in addition to improved coating properties.

Examples of the amino group addition compound include, for example, (1) adducts of an epoxy resin with primary mono- and polyamines, secondary mono- and polyamines, or primary and secondary mixed polyamines (see, for example, U.S. Pat. No. 3,984,299); (2) adducts of epoxy resins with secondary mono- and polyamines having ketiminated primary amino groups (see, for example, U.S. Pat. No. 4,017,438); and (3) reaction products obtained by etherifying epoxy resins with hydroxy compound having ketiminated primary amino groups (see, for example, JP S59-43013A) and the like.

Examples of the primary mono- and polyamines secondary mono- and polyamines or primary and secondary mixed polyamines which are used in the manufacture of the amino group-containing epoxy resins as described above in (1) include mono- or di-alkylamines such as monomethylamine, dimethylamine, monoethylamine, diethylamine, monoisopropylamine, diisopropylamine, monobutylamine, and dibutylamine; alkanolamines such as monoethanolamine, diethanolamine, mono(2-hydroxypropyl)amine, and monomethylaminoethanol; alkylene polyamines such as ethylenediamine, propylenediamine, butylenediamine, hexamethylenediamine, diethylenetriamine, and triethylenetetramine; and the like.

Examples of the secondary mono- and polyamines containing a ketiminated primary amino group used for the manufacture of the amino group-containing epoxy resin described above in (2) include ketiminated products obtained by reacting a ketone compound with, for example, diethylenetriamine, among the primary and secondary mixed polyamines described above in (1) as materials used for producing the amine-added epoxy resin.

Examples of the ketiminated primary amino group-containing hydroxy compound described above in (3) as a material used for producing the amino group-containing epoxy resin include hydroxy group-containing ketiminated products obtained by reacting a ketone compound with a primary amino group- and hydroxy-containing compound, for example, monoethanolamine or mono(2-hydroxypropyl)amine, among the primary mono- and polyamines, secondary mono- and polyamines, and primary and secondary mixed polyamines as materials used for producing the amino group-containing epoxy resin described above in (1).

In addition, an active hydrogen group other than the aforementioned amino group can be added.

The active hydrogen group-containing compound is not limited as long as it has a reactive functional group (e.g., a carboxyl group, a primary amino group or a secondary amino group) which is capable of reacting with an epoxy group other than the active hydrogen group as a donor component, and specifically include an active methylene group-containing compound such as malonic acid, alkyl malonate, acetoacetic acid, isobutyrylacetic acid, benzoyl acetic acid, propionyl acetic acid; thiol group-containing compounds such as thioglycolic acid, thiomalic acid, thiosalicylic acid, dithiosalicylic acid, mercaptopropionic acid, 3-mercaptobutyric acid; hydroxy group-containing compounds such as lactic acid, glycolic acid, dimethylolpropionic acid, hydroxybutyric acid, glyceric acid, dimethylolbutanoic acid, salicylic acid, mandelic acid, ε-caprolactone, monoethanolamine; and the like. These active hydrogen group-containing compounds may be used alone or in combinations of two or more species.

The above active hydrogen group-containing epoxy resins can be modified by modifiers, if necessary. Such modifiers are not particularly limited as long as having reactivity with epoxy resins, and include, for example, polyamide amines, polycarboxylic acids, fatty acids, polyisocyanate compounds, polyisocyanate compounds, acrylic monomers, acrylic monomer polymerized compounds, xylene formaldehyde compounds, and epoxy compounds. These modifiers can be used alone or in combination of two or more.

The addition of the aforementioned amine compounds, the active hydrogen group-containing compounds, or the modifiers to epoxy resins can usually be carried out in a suitable solvent at a temperature of about 80 to about 170° C., preferably about 90 to about 150° C. for about 1 to 6 hours, preferably about 1 to 5 hours.

The reaction solvents described above include, for example, hydrocarbons such as toluene, xylene, cyclohexane, n-hexane; esters such as methyl acetate, ethyl acetate, and butyl acetate; ketones such as acetone, methyl ethyl ketone, methyl isobutyl ketone, methyl amyl ketone; amides such as dimethylformamide, dimethylacetamide; alcohols such as methanol, ethanol, n-propanol and isopropanol; ether alcohol compounds such as ethyleneglycol monobutyl ether and diethylene glycol monoethyl ether; or mixtures thereof.

It is generally preferable for the number average molecular weight of the active hydrogen group-containing epoxy resin to be within the range of 1,000 to 50,000 from the viewpoints of finished appearance, corrosion resistance, etc., further within the range of 1,300 to 20,000, and more particularly within the range of 1,600 to 10,000.

The amine value of the active hydrogen group-containing epoxy resin is generally more than 10 mg KOH/g, preferably within the range of 20 to 200 mg KOH/g, and more preferably within the range of 30 to 150 mg KOH/g, based on the resin solids content.

The amine value in the present specification is measured according to the JIS K 7237-1995 standard. All of the amine values are those per resin solids (mg KOH/g).

In the present specification, the number-average molecular weight and the weight-average molecular weight are calculated by converting the retention time (retention volume) measured using gel permeation chromatography (GPC) to the molecular weight of polystyrene using the retention time (retention volume) of a standard polystyrene with a known molecular weight measured under the same conditions. Specifically, using "HLC8120GPC" (trade name, manufactured by Tosoh) as a gel permeation chromatography apparatus, and using four columns of "TSKgel G-4000HXL," "TSKgel G-3000HXL," "TSKgel G-2500HXL," and "TSKgel G-2000HXL" (trade names, all manufactured by Tosoh) as columns, it is possible to measure under the conditions of mobile phase tetrahydrofuran, a measurement temperature of 40° C., a flow rate of 1 mL/min, and a detector RI.

A dispersion method of the active hydrogen group-containing epoxy resin obtained in this manner in the aqueous solvent is not particularly limited, and a known method can be used per se. However, it is preferable to neutralize the active hydrogen group-containing epoxy resin solution with acid compounds and disperse it.

Known acid compounds can be used as the acid compounds without particular limitation, and specific examples include inorganic acids such as hydrochloric acid, nitric acid, phosphoric acid, sulfamic acid; organic acids including carboxylic acid compounds such as formic acid, acetic acid, propionic acid, lactic acid, and the like. These acid compounds can be used alone or in combinations of two or more. Among these acid compounds, organic acids can be preferably used, and carboxylic acid compounds can be more preferably used.

Alternatively, an emulsifier can be used as an alternative method of dispersion. The emulsifier described above can be used without particular limitation, and include, for example, nonionic emulsifiers, cationic emulsifiers, or anionic emulsifiers, which can be used alone or in combinations of two or more. Among these emulsifiers, nonionic emulsifiers and/or cationic emulsifiers are preferred, and cationic emulsifiers are more preferred.

(Emulsion Particle (B) Containing Acceptor Components for Michael Addition Reaction)

The emulsion particle (B) containing the Michael Addition Reaction acceptor component is an emulsion particle containing a compound (B-1) having at least one α,β-unsaturated carbonyl group selected from the group consisting of (meth)acryloyloxy group-containing compounds, (meth)acrylamide group-containing compounds, maleic acid-based compounds, fumaric acid-based compounds, and itaconic acid-based compounds.

The compound (B-1) having the α,β-unsaturated carbonyl group is not particularly limited as long as it contains more than one acceptor component (α,β-unsaturated carbonyl group) per molecule, and the (meth)acryloyloxy group-containing compounds include a diacrylate such as ethylene glycol diacrylate, propylene glycol diacrylate, diethylene glycol diacrylate, dipropylene glycol diacrylate, triethylene glycol diacrylate, tripropylene glycol diacrylate, tetraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentylglycol diacrylate, cyclohexanedimethanol diacrylate, ethoxylated neopentylglycol diacrylate, propoxylated neopentylglycol diacrylate, ethoxylated cyclohexanedimethanol diacrylate, propoxylated cyclohexanedimethanol diacrylate, acrylated epoxydiacrylate, allyluretane diacrylate, aliphatic uretane diacrylate, polyester diacrylate; a triacrylate such as trimethylolpropane triacrylate, glycerol triacrylate, ethoxylated trimethylolpropane triacrylate, propoxylated trimethylolpropane triacrylate, tris(2-hydroxyethyl) isocyanurate triacrylate, ethoxylated glycerol triacylate, propoxylated glycerol triacrylate, pentaerythritol triacrylate, allyl urethane triacrylate, aliphatic urethane triacrylate, melamine triacrylate, aliphatic epoxy triacrylate, epoxy novolac triacrylate, and polyester triacrylate; a tetra acrylate such as di-trimethylol propane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetra acrylate, allylurethane tetraacrylate, aliphatic urethane tetraacrylate, melamine tetraacrylate, epoxynovolac tetraacrylate; pentaacrylate such as dipentaerythritol pentaacrylate, melamine pentaacrylate, and the like. These compounds may be used alone or in combinations of two or more species.

As the α,β-unsaturated carbonyl group containing compound (B-1) described above, it is also suitable to use a compound whose skeleton is a resin. Examples of manufacturing methods of the compound (B-1) include synthesizing of polyester resins, acrylic resins, epoxy resins, etc., and (1) the reaction of glycidyl (meth) acrylates with the carboxyl group of the resins, (2) the reaction of isocyanate ethyl (meth) acrylates with the hydroxy group of the resins, or (3) the reaction of (meth) acrylates, maleates, fumarates, itaconates, etc. with the epoxy group of the resins, and the like.

Polyester resins obtained by polycondensation reactions between polyvalent carboxylic acids including (anhydride) maleic acid, fumaric acid, itaconic acid, etc. and polyhydric alcohols such as ethylene glycol, diethylene glycol, propylene glycol, tetramethylene glycol, 1,6-hexanediol, neopentyl glycol, trimethylol propane, glycerin, pentaerythritol, and polyamide resins obtained by polycondensation reactions using polyhydric amines instead of the aforementioned polyhydric alcohols can also be used. Other examples include urethane compounds obtained by reacting polyfunctional polyisocyanate compounds with compounds having hydroxy and acryloyl groups (e.g., 2-hydroxyethyl acrylate, 4-hydroxybutyl methacrylate, etc.).

Among these, the $\alpha,\beta$-unsaturated carbonyl group-containing epoxy resin and/or the $\alpha,\beta$-unsaturated carbonyl group-containing acrylic resin are preferred, and $\alpha,\beta$-unsaturated carbonyl group-containing epoxy resin is more preferred.

As the $\alpha,\beta$-unsaturated carbonyl group containing epoxy resin described above, the epoxy resin described previously as the epoxy resin used for the formation of the active hydrogen group containing epoxy resin described above can be used as a raw material. It is preferable to add a tertiary amino group from the viewpoint of the coating property of cationic electrodeposition coating to the epoxy resin. (It is preferable for the $\alpha,\beta$-unsaturated carbonyl group containing epoxy resin to not contain primary and secondary amino groups that have an effect as a donor component.)

In addition, the $\alpha,\beta$-unsaturated carbonyl group-containing epoxy resin may be modified by a modifier similar to the active hydrogen group-containing epoxy resin.

It is generally preferable for the number average molecular weight of the $\alpha,\beta$-unsaturated carbonyl group-containing epoxy resin to be within the range of 1,000 to 50,000 from the viewpoints of finished appearance, corrosion resistance, etc., more preferably within the range of 1,300 to 20,000, and particularly preferably within the range of 1,600 to 10,000.

The amine value of the $\alpha,\beta$-unsaturated carbonyl group-containing epoxy resin is generally 10 mg KOH/g or more based on the resin solids content, preferably within the range of 20 to 200 mg KOH/g, and more preferably within the range of 30 to 150 mg KOH/g.

The method for dispersing the $\alpha,\beta$-unsaturated carbonyl group-containing epoxy resin obtained as described above in an aqueous solvent is not particularly limited, and a known method can be used. However, it is preferable to neutralize the $\alpha,\beta$-unsaturated carbonyl group-containing epoxy resin solution with an acid compound and disperse it in water.

As the acid compound, known acid compounds can be used without particular limitation, and specific examples include, for example, inorganic acids such as hydrochloric acid, nitric acid, phosphoric acid, sulfamic acid; organic acids including carboxylic acid compounds such as formic acid, acetic acid, propionic acid, lactic acid, and the like. These acid compounds can be used alone or in combinations of two or more species. Among these acid compounds, organic acids can be preferably used, and particularly, the carboxylic acid compounds can be more preferably used.

Alternatively, an emulsifier can be used as an alternative method of dispersion. The emulsifiers described above can be used without particular limitation and include, for example, nonionic emulsifiers, cationic emulsifiers, or anionic emulsifiers, which can be used alone or in combinations of two or more. Among these emulsifiers, nonionic emulsifiers and/or cationic emulsifiers are preferred, and cationic emulsifiers are more preferred.

(Michael Addition Catalyst (C))

The Michael addition reaction catalyst (C) contained in the cationic electrodeposition coating composition of the present disclosure is included in either the emulsion particle (A) or the emulsion particle (B) described above, or microencapsulated in the cationic electrodeposition coating composition.

As the Michael addition catalyst (C), known catalysts for Michael addition reaction can be used without particular limitation, and at least one compound selected from the group consisting of alkali metal hydroxides, alkali metal carbonates, quaternary ammonium compounds, tertiary amine compounds, guanidine compounds, amidine compounds, tertiary phosphine compounds, phosphazene compounds, tertiary sulfonium compounds, quaternary phosphonium compounds, and imidazole compounds can be preferably used. These compounds may be used alone or in combinations of two or more species. Among these compounds, a basic catalyst is preferred from the viewpoint of catalytic performance.

The amidine compounds described above can be used without particular limitation and include, for example, 1,5-diazabicyclo[4,3,0]-nonene-5(DBN), 1,5-diazabicyclo[4,4,0]-decen-5,1,8-diazabicyclo[5,4,0]-undecene-7(DBU), 5-hydroxypropyl-1,8-diazabicyclo[5,4,0]-undecene-7,5-dibutylamino-1,8-diazabicyclo[5,4,0]-undecene-7 and the like.

The guanidine compounds described above can be used without particular limitation and include, for example, 1,3-diphenylguanidine, 1,3-dimethylguanidine, 1,1,3,3-tetramethylguanidine (TMG). These catalysts can be used alone or in combinations of two or more species.

As the Michael addition reaction catalyst (C), the acid dissociation constant (pKa) of the basic catalyst is preferably 10 or more, more preferably 12 or more, particularly from the viewpoint of catalytic performance.

The basic catalyst is preferably a compound with a molecular weight of 100 or more, more preferably a molecular weight of 200 or more, and further preferably a molecular weight of 300 or more from the viewpoints of the finished appearance of the coating and water resistance of the coating.

The methods of increasing the molecular weight of the basic catalyst include for example, in the case of the amidine catalyst or the guanidine catalyst described above, (1) reacting the primary or secondary amino groups of the amidine catalyst or the guanidine catalyst above described with a compound containing a reactive functional group such as an epoxy or an isocyanate group, and (2) reacting the amidine catalyst or the guanidine catalyst above described with a carbodiimide compound, and both of these methods can be favorably used.

The blending quantity of the Michael addition catalyst (C) in the cationic electrodeposition coating composition is preferably within the range of 0.1 to 10% by mass and more preferably within the range of 0.5 to 7% by mass, based on the resin solids.

In the case that the Michael addition reaction catalyst (C) is contained in either the emulsion particle (A) containing the Michael addition reaction donor component or the emulsion particle (B) containing the Michael addition reaction acceptor component, it is preferred that the Michael addition reaction catalyst (C) is contained in the emulsion particle (B) containing the Michael addition reaction acceptor component from the viewpoint of the stability of the coating. Without wishing to be bound by any particular theory, it is believed that the Michael addition reaction starts when the catalyst (C) extracts hydrogen ions from the donor component.

Methods for causing the Michael addition reaction catalyst (C) to be included in the emulsion particle (B) include, for example, a method of homogeneously mixing the catalyst (C) with a component that contains the α,β-unsaturated carbonyl group containing compound (B-1), and then admixing with water to emulsify by phase change. In this case, emulsifiers can be used as needed.

In the case that the Michael addition reaction catalyst is microencapsulated in the cationic electrodeposition coating composition, it may be present in either the emulsion particle (A), in the emulsion particle (B), or in the solvent, since the catalyst is less likely to come into contact with other components.

Also, the microencapsulated catalyst is preferably a temperature-sensitive microencapsulated catalyst (C-1), since it is preferable for the encapsulated catalyst to be eluted by heat and diffused into the uncured coating after coating, and then for the Michael addition reaction to begin.

As used herein, temperature sensitivity means a property of the catalyst changes with changes in temperature. Specifically, the temperature-sensitive microencapsulated catalyst is one in which the state of the microcapsule changes when the temperature exceeds a certain temperature and the catalyst inside elutes.

The elution temperature is preferably between 30° C. and 130° C., more preferably between 30° C. and 100° C., and further preferably between 30° C. and 80° C.

As methods for microencapsulation, core/shell-type particles are known, which have a catalytic core and a shell of a temperature-sensitive polymer having a LCST (lower critical solution temperature) or a Tg (glass-transition temperature) of a desired temperature (30-130° C. in the present disclosure).

Here, a temperature-sensitive polymer with a lower critical solution temperature (LCST) is a polymer having the property of becoming soluble in a solvent at a temperature (LCST) or lower and causing aggregation at a temperature (LCST) or higher in the polymer solution. In the present disclosure, by using the above temperature-sensitive polymer in the shell portion, it is stable with respect to an aqueous solvent at room temperature (e.g., around 20° C.), but the shell portion collapses when the temperature exceeds the lower critical solution temperature by warming, and the catalyst of the core portion will elute and diffuse into the uncured coating film.

The temperature-sensitive polymer with a Tg (glass-transition temperature) is a polymer in which glass transition occurs at a certain temperature. In the present disclosure, by using the above temperature-sensitive polymer in the shell portion, the shell portion is formed at room temperature (e.g., around 20° C.), the shell portion fuses when the glass-transition temperature is exceeded by warming, and the catalyst of the core portion will elute and diffuse into the uncured coating film.

The temperature-sensitive polymer described above can be favorably used as long as the polymer has a LCST or a Tg at a certain temperature, but from the viewpoint of flexibility in designing resins, it is preferable that the Tg (glass-transition temperature) of the temperature-sensitive polymer is between 30° C. and 130° C., and a Tg between 50° C. and 110° C. is more preferable. In addition, it is preferable to use an acrylic resin obtained by copolymerization of polymerizable unsaturated monomers.

Here, in the present disclosure, a Tg (glass-transition temperature) can be measured by DSC (differential scanning calorimetry).

Polymerizable unsaturated monomers with lower critical solution temperatures (LCST) include, for example, N-isopropyl acrylamide (LCST 30.9° C.), N-n propyl acrylamide (LCST 21.5° C.), N-n propyl methacrylamide (LCST 28.0° C.), N,N-diethyl acrylamide (LCST 32.0° C.) (Reference: Shoji Ito, KOBUNSHI RONBUNSHU, Vol. 46(7), (1989), p. 437-443). In addition, N-substituted (meth)acrylamide derivatives that do not exhibit lower critical solution temperatures (LCST) include, for example, N,N-dimethyl (meth)acrylamide, hydroxyethyl (meth)acrylamide, acryloylmorpholine, N,N-dimethylaminopropylacrylamide, and the like. These polymerizable unsaturated monomers and N-substituted (meth)acrylamide derivatives may be used alone or in combinations of two or more species.

As a manufacturing method of the above core/shell type temperature-sensitive microencapsulation catalyst, a known method per se can be used without particular limitation. Specific examples include (1) a method in which a temperature-sensitive polymer and a catalyst are mixed, and then water is added to perform phase change emulsification, (2) a method in which a pre-emulsion of a monomer which is a precursor of a temperature-sensitive polymer is added dropwise and emulsion-polymerized after emulsifying the catalyst in an aqueous solution, (3) a method in which a pre-emulsion of a monomer that is a precursor of a temperature-sensitive polymer is added dropwise into an aqueous solution and emulsion-polymerized, and then encapsulated, (4) a method in which a monomer that is a precursor of a temperature-sensitive polymer and a catalyst are mixed in advance, and then added dropwise into an aqueous solution and emulsion-polymerized, and (5) a method in which a monomer that is a precursor of a temperature-sensitive polymer and a catalyst are mixed in advance to prepare a pre-emulsion, and then mini-emulsion polymerization is performed. An emulsifier can be used in any of the above methods.

Here, pre-emulsifying is the emulsification of a monomer solution by adding water (pure water, distilled water, ion-exchanged water, deionized water, etc.) and diluting it. The pre-emulsion may contain additives such as emulsifiers, neutralizers, polymerization initiators, and the like.

As a manufacturing method using the emulsion polymerization described as (2) to (4) above, for example, it can be carried out by emulsion polymerization by adding a pre-emulsion dropwise to water. The polymerization reaction is generally carried out at temperatures between 40° C. and 100° C., and preferably between 60° C. and 95° C.

Polymerizable unsaturated monomers which are generally used in the synthesis of acrylic resins can be used without particular limitation. Examples include styrene; non-functional (meth)acrylates such as methyl (meth)acrylate, ethyl (meth)acrylate, n-propyl (meth)acrylate, isopropyl (meth)acrylate, n-butyl (meth)acrylate, iso-butyl(meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, etc.; hydroxy group containing polymerizable unsaturated monomers such as 2-hydroxyethyl (meth)acrylate, 2-hydroxypropyl (meth)acrylate, 3-hydroxypropyl (meth)acrylate, and 4-hydroxybutyl (meth)acrylate; carboxyl group-containing polymerizable unsaturated monomers such as (meth) acrylic acid, maleic acid, crotonic acid and β-carboxyethyl acrylate; nitrogen-containing polymerizable unsaturated monomers containing no urethane bond such as adducts of (meth) acrylonitrile, (meth) acrylamide, N,N-dimethylaminoethyl (meth) acrylate, N,N-diethylaminoethyl (meth) acrylate, N,N-dimethylaminopropyl (meth) acrylamide or glycidyl (meth) acrylate and amines; polymerizable unsaturated monomers having a urethane bond such as reaction products of isocyanate group-containing polymerizable unsaturated monomers with hydroxyl group-containing compounds, and reaction products of hydroxyl group-containing polymerizable unsaturated monomers with isocyanate group-containing compounds; epoxy group-containing polymerizable unsaturated monomers such as glycidyl (meth) acrylate, β-methylglycidyl (meth) acrylate, 3,4-epoxy cycyclohexylmethyl (meth) acrylate, 3,4-epoxycyclohexylethyl (meth) acrylate, 3,4-epoxycyclohexylpropyl (meth) acrylate, and allylglycidyl ether; (meth) acrylate having a polyoxyethylene chain with an alkoxy terminal; polymerized unsaturated monomers with a sulfonic acid group such as 2-acrylamide-2-methylpropanesulfonic acid, 2-sulfoethyl (meth) acrylate, allylsulfonic acid, 4-styrenesulfonic acid, and sodium and ammonium salts of these sulfonic acids; polymerizable unsaturated monomers with a phosphate group such as 2-acryloyloxyethylacid phosphate, 2-methacryloyloxyethylacid phosphate, 2-acryloyloxypropylacid phosphate, 2-methacryloyloxypropylacid phosphate; polymerizable unsaturated monomers with an alkoxysillyl group such as vinyl trimethoxysilane, vinyl triethoxysilane, vinyl tris (2-methoxyethoxy) silane, γ-(meth)acryloyloxypropyl triemethoxysilane, γ-(meth) acryloyloxypropyl triethoxysilane; perfluoroalkyl(meth) acrylates such as perfluorobutylethyl (meth)acrylate, perfluoroocthylethyl (meth)acrylate; polymerizable unsaturated monomers with a fluoroalkyl group such as fluoroolefin; polymerizable unsaturated monomers with a photopolymerizable functional group such as a maleimide group; (meth) acrylate having a polyoxyethylene chain with alkoxy terminal; polymerizable unsaturated monomers having two or more polymerizable unsaturated groups in one molecule such as allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylol propan tri(meth)acrylate, 1,4-butanediol di(meth)acrylate, neopentyl glycol di(meth) acrylate, 1,6-hexanediol di(meth)acrylate, pentaerythritol di(meth)acrylate, pentaerythritol tetra(meth)acrylate, glycerol di(meth)acrylate, 1,1,1-tris(hydroxymethyl)ethane di(meth)acrylate, 1,1,1-tris (hydroxymethyl)ethane tri(meth)acrylate, 1,1,1-tris(hydroxymethyl)propane tri(meth)acrylate, triallyl isocyanurate, diallyl terephthalate, and divinylbenzene; polyalkylene glycol macromonomers such as polyethylene glycol (meth) acrylate, polypropylene glycol (meth) acrylate, methoxy polyethylene glycol (meth) acrylate, ethoxy polyethylene glycol (meth) acrylate. These monomers may be used alone or in combinations of two more species. Among these monomers, the monomer having the tertiary amino group is preferred from the viewpoint of the coating properties of the cationic electrodeposition coating. In addition, from the viewpoint of creating a non-fragile shell, it is preferable to use a polymerizable unsaturated monomer having two or more polymerizable unsaturated groups per molecule, and/ or to use a polymerizable unsaturated monomer having a high Tg (≥50° C.) at 50 or more by mass.

The emulsifiers described above include, but are not limited to, as long as the emulsifiers are used in the synthesis of acrylic emulsion, for example, cationic emulsifier, anionic emulsifier, nonionic emulsifier, and the like. These emulsifiers can be used alone or in combinations of two or more. Among these emulsifiers, cationic emulsifier is preferred.

The amount of the above emulsifier is preferably about 0.1 to 15% by mass, more preferably about 0.5 to 10% by mass, and further preferably about 1 to 5% by mass, based on the total amount of all monomers used.

Polymerization initiators used in the synthesis of acrylic emulsion include, but are not limited to, organic peroxides, azo compounds, persulfates, and the like, which may be either of the oil-soluble or water-soluble type. These polymerization initiators can be used alone or in combinations of two or more.

The amount of the polymerization initiators which are used is generally about 0.1 to 5% by mass, and more preferably about 0.2 to 3% by mass, based on the total mass of all monomers which are used. The method of addition of the polymerization initiator is not particularly limited, and may be selected depending on the type and quantity, etc. thereof. For example, the polymerization initiators may be incorporated into a monomer mixture or an aqueous medium in advance, or may be added together or added dropwise during polymerization.

The resulting core/shell-type temperature-sensitive microencapsulated catalyst is water dispersible and can have an average particle size generally in the range of 10-1000 nm, preferably in the range of 40-500 nm, and particularly preferably in the range of 70-200 nm.

In the present specification, the mean particle size of a temperature-sensitive microencapsulated catalyst is measured at 20° C. using a submicron particle size distribution analyzer after dilution with deionized water by conventional methods. For example, "COULTER N4 type" (trade name, manufactured by Beckman-Coulter) can be used as a device for measuring sub-micron particle size distributions.

In the present disclosure, it is preferable that the Michael addition reaction catalyst (C) is present within either the emulsion particle (A), the emulsion particle (B), or the microcapsule from the viewpoint of storage stability, and it is preferable that the Michael addition reaction catalyst (C) is not eluted in the aqueous solvent of the cationic electrodeposition coating composition.

Therefore, the content of the Michael addition reaction catalyst (C) contained in the solvent component (supernatant liquid) when the cationic electrodeposition coating composition is centrifuged under the following conditions and separated into a solid component (mainly resin and pigment) and a solvent component is generally 30% or less by mass, preferably 20% or less by mass, and more preferably 10% or less by mass, based on the blending quantity in the cationic electroporation coating composition. The catalyst (C) can be measured by conventional techniques well known to those skilled in the art, including, for example, gas chromatography and liquid chromatography.

<Centrifugation Conditions>

The cationic electrodeposition composition is centrifuged at 25° C. and a relative centrifugal acceleration of $3.5 \times 10^4$ G for 5 hours.

The cationic electrodeposition coating compositions of the present disclosure may contain, as necessary, pigment dispersion pastes, resins (acrylic, epoxy, urethane, block isocyanate, and melamine resins), additives (surfactants, surface modifiers, neutralizers), solvents, and the like, as well as the essential ingredients, emulsion particles (A), emulsion particles (B), and Michael addition reaction catalysts (C).

The pigment dispersion paste is a pigment in which pigments such as coloring pigments, rust-preventive pigments, and extender pigments are dispersed in fine particles in advance, and for example, various additives such as pigment dispersing resins, pigments, and neutralizers can be prepared by blending various additives such as a pigment-dispersing resin, a pigment, and a neutralizing agent, and performing a dispersion treatment in a dispersion mixer such as a ball mill, a sand mill, and a pebble mill.

Known pigment dispersing resins can be used without particular limitation, and for example, epoxy resins or acrylic resins with hydroxyl and cationic groups, tertiary amine-type epoxy resins, quaternary ammonium salt-type epoxy resins, tertiary sulfonium salt-type epoxy resins, tertiary amine-type acrylic resins, quaternary ammonium salt-type acrylic resins, tertiary sulfonium salt-type acrylic resins, etc. can be used.

Known pigments can be used without particular limitation, e.g. colored pigments such as titanium oxide, carbon black, colcothar; constitutional pigments such as clay, mica, baryta, calcium carbonate, silica; anti-rust pigments, etc.

In addition, in the cationic electrodeposition coating compositions of the present disclosure, the pigment dispersion paste may be contained in the emulsion particles (A) or the emulsion particles (B).

The content of the pigment in the above pigment dispersion paste is preferably within the range of 1 to 100 parts by mass, and particularly preferably 10 to 50 parts by mass, per 100 parts by mass of the resin solids of the cationic electrodeposition coating composition.

The cationic electrodeposition coating composition of the present disclosure favorably contains more than 50% by mass, preferably more than 70% by mass, and more preferably more than 90% by mass of water in the solvent. It can be said that the cationic electrodeposition coating composition is practically an aqueous coating composition.

In the cationic electrodeposition coating composition of the present disclosure, the percentage of the Michael addition reaction donor component (active hydrogen group-containing compound) contained in the emulsion particles (A) and the Michael addition reaction acceptor component (a compound having an α,β-unsaturated carbonyl group) contained in the emulsion particles (B) is generally 0.5/1 to 1/0.5, and is preferably 0.7/1 to 1/0.7 in terms of the reactive functional group ratio (molar ratio) of the Michael addition reaction, which is favorable for obtaining a coating article with good storage stability and superior finished appearance and corrosion resistance.

Also, in the present disclosure, from the viewpoint of corrosion resistance, it is preferred that at least one of the compounds containing a coating active hydrogen group (A-1) or a compound having an α,β-unsaturated carbonyl group (B-1) is an epoxy resin with a weight average molecular weight of 1,800 or more. Alternatively, one may be an epoxy resin with a weight-average molecular weight of 1,800 or more, and the other may be a compound with a weight-average molecular weight of less than 1,800.

The amine value of all of the resin contained in the coating is generally within the range of 5 to 200 mg KOH/g, and preferably 10 to 150 mg KOH/g, based on the resin solids content. By the blending ratio being within the above ranges, at least one of the aforementioned coating properties and coating performance will be superior.

[Method for Electrodeposition Coating]

The method for electrodeposition coating of the present disclosure includes immersing a substrate in an electrodeposition bath that includes a cationic electrodeposition coating composition, and conducting electrodeposition on the substrate by applying electricity to the substrate as a cathode.

The substrate to which the cationic electrodeposition coating composition of the present disclosure is applied includes an automobile body, two-wheeled vehicle components, household equipment, other equipment, and the like, and there is no particular limitation as long as it is a substrate that contains metal.

Metal steel sheets to be used as the substrate include cold-rolled steel sheets, alloyed hot dip galvanized steel sheets, electrolytic zinc-plated steel sheets, electrolytic zinc-iron two-layer plated steel sheets, organic composite plated steel sheets, aluminum materials, magnesium materials, as well as these metal sheets which are subjected to surface treatments such as phosphate chemical conversion treatment, chromate treatment, composite oxide treatment, etc. after the surfaces are cleansed by alkali-defatting, etc., as necessary.

The cationic electrodeposition coating composition can be coated onto a desired substrate surface by cationic electrodeposition coating. The cationic electrodeposition method is generally performed by diluting with deionized water, etc. to make a solids content of about 5 to 40% by mass, preferably 10 to 25% by mass. Further, the pH of the cationic electrodeposition coating composition is adjusted to be within a range from 4.0 to 9.0, and preferably a range within 5.5 to 7.0. The cationic electrodeposition coating composition is used as a bath, generally at a bath temperature of 15 to 35° C., and an electric current is applied at a loading voltage of 100 to 400V, preferably 150 to 350V, with the substrate as a cathode. After electrodeposition coating, the coated substrate is washed thoroughly with ultrafiltrate (UF filtrate), reverse osmosis water (RO water), industrial water, pure water, etc. in order to remove excess cationic electrodeposition coating which is adhered on the substrate.

The thickness of an electrodeposition coating film is not particularly limited but can generally range from 5 to 40 µm, and preferably 10 to 30 µm, based on a dry coating film. In a baking drying process of the coating film, generally, the temperature of the surface of the coating is higher than 160° C. and lower than 200° C. using heating drying equipment such as an electric hot air dryer and a gas hot air dryer. In the present disclosure, a temperature of 0° C. to 130° C., preferably 5° C. to 130° C., and more preferably 10° C. to 80° C. is favorable from the viewpoint of energy cost reduction.

In the case that a microencapsulated catalyst is used as the Michael addition reaction catalyst, it is preferred that the temperature of the coating surface is the Tg of the microcapsule or higher.

The baking time is generally 10 to 180 minutes, preferably 20 to 50 minutes, during which the electrodeposition film is heated.

A cured coating can be obtained by the aforementioned baking and drying.

In addition, in the present disclosure, electromagnetic induction heating can be used as a heating and drying facility from the viewpoint of energy cost reduction and processing time reduction.

In the case that the electromagnetic induction heating described above is used, the temperature of the coating surface is the same temperature as above (generally 0 to 130° C., preferably 5 to 130° C., and more preferably 10 to 80° C.), but the baking time is generally 1 to 15 minutes, preferably 1 to 12 minutes, and more preferably 1 to 9 minutes.

EXAMPLES

Hereinafter, the present disclosure will be described in greater detail by the examples of preparations, examples, and comparative examples below, but the present disclosure is not limited to these examples, In the Examples to be described below, the term "parts" indicates parts by mass, and the symbol "%" indicates mass %.

Manufacturing examples of each component used in the examples and the comparative examples are shown below.

Manufacturing Example 1

(Active Hydrogen Group-Containing Epoxy Resin No. 1 (Michael Addition Reaction Donor Component))

400 parts of bisphenol A and 0.2 parts of dimethylbenzylamine were added to 1000 parts of jER828EL (trade name, manufactured by Mitsubishi Chemical Corporation, epoxy resin, epoxy equivalent weight 190, number-average molecular weight 370) in a flask equipped with a stirrer, a thermometer, a nitrogen-introducing tube, and a reflux condenser, and reacted at 130° C. until the epoxy equivalent weight was 850. Then, 15 parts of diethylamine and 187 parts of ketiminated diethylenetriamine and methyl isobutyl ketone were added and reacted at 120° C. for 4 hours. Further, 102 parts of acetoacetic acid was added and reacted for 4 hours. The product of the reactions was adjusted with ethylene glycol monobutyl ether to obtain an active hydrogen group containing epoxy resin solution having a solids content of 80%. The active hydrogen group-containing epoxy resin had an amine value of 84 mg KOH/g and a weight-average molecular weight of 2,000.

Manufacturing Example 2

(Epoxy resins with α,β-unsaturated carbonyl groups (Michael Addition Reaction Acceptor Components))

790 parts of hydrogenated bisphenol A, maleic acid adducts (compound obtained by adding 1 mol of hydrogenated bisphenol A and 2 mol of maleic acid), 1000 parts of jER828EL (trade name, Mitsubishi Chemical Corporation, epoxy resin, epoxy equivalent 190, number average molecular weight 370), and 0.2 parts of dimethylbenzylamine were placed in a flask equipped with a stirrer, a thermometer, a nitrogen introducing tube, and a reflux condenser, and reacted at 130° C. for 5 hours. Next, 178 parts of diethylamine was added and reacted at 120° C. for 4 hours. The product of these reactions was adjusted with ethylene glycol monobutyl ether to obtain an α,β-unsaturated carbonyl group containing epoxy resin solution having a solids content of 80%. The α,β-unsaturated carbonyl group containing epoxy resin had an amine value of 78 mg KOH/g and a weight average molecular weight of 2,000.

Manufacturing Example 3

(Amino Group-Containing Epoxy Resin No. 1)

1200 parts of jER828EL (trade names, Mitsubishi Chemical Co., Ltd., epoxy resin, epoxy equivalent 190, number-average molecular weight 370), 500 parts of bisphenol A and 0.2 parts of dimethylbenzylamine were placed in a flask equipped with a stirrer, a thermometer, and a reflux condenser, and reacted at 130° C. until an epoxy equivalent reached 850. Next, 160 parts of diethanolamine and 65 parts of ketiminated compound of diethylenetriamine and methyl isobutyl ketone were added, and after reacting at 120° C. for 4 hours, 480 g of ethylene glycol monobutyl ether was added to obtain an amino group containing epoxy resin solution having a solids content of 80%. The amino group-containing epoxy resin had an amine value of 59 mg KOH/g and a weight-average molecular weight of 1,900.

Manufacturing Example 4

(Epoxy Resin-Added Amine Catalyst No. 1 (Michael Addition Reaction Catalyst))

70 parts of jER828EL (trade names, Mitsubishi Chemical Corporation, epoxy resin, epoxy equivalent 190, a number-average molecular weight 370), 230 parts of 1,1,3,3-tetramethylguanidine, and 500 parts of isobutyl methyl ketone were placed in a flask equipped with a stirrer, thermometer, and reflux condenser, 3, the mixture was warmed to 120° C., and reacted for 5 hours. Then, isobutyl methyl ketone was added to prepare a solid component to obtain an amine catalyst (Michael Addition Reaction Catalyst) solution having a solids content of 50%.

Manufacturing Example 5

(Microencapsulated Catalyst No. 1 (Michael Addition Reaction Catalyst))

500 parts of butyl cellosolve was placed in a reaction vessel equipped with a stirrer, a thermometer, a decanter, a reflux condenser, a nitrogen introducing tube, and a dropping funnel and was raised to 120° C. while introducing nitrogen gas, and a mixture of 100 parts of styrene, 500 parts of methyl methacrylate, 100 parts of butyl aminoethyl methacrylate, 100 parts of dimethylaminoethyl methacrylate, 200 parts of methoxy polyethylene glycol methacrylate, and 10 parts of t-butyl peroxy-2-ethylhexanoate was added dropwise over 3 hours. After dropping, a reaction was further conducted at 120° C. for 1 hour, the mixture was cooled, and the solution was adjusted with butyl cellosolve to obtain a tertiary amino group-containing acrylic resin having a solids content of 50%. The Tg of the obtained resin was 60° C. and the amine value was 35 mg KOH/g.

30 parts of the tertiary amino group-containing acrylic resin described above and 70 parts of the epoxy resin-added amine catalyst obtained in Manufacturing Example 4 were mixed. Further, an emulsion was formed by phase change by slowly adding ion-exchanged water while stirring vigorously. By evaporating the solvent under reduced pressure, a microencapsulated catalyst (Michael addition reaction catalyst) having a solids content of 32% was obtained. The microencapsulated catalyst has a core-shell type microencapsulation structure with the aforementioned epoxy resin as a core portion and the aforementioned acrylic resin as a shell portion, and elution of the core portion (epoxy resin) begins when the temperature of the shell (acrylic resin) becomes greater than 60° C., which is the Tg of the shell.

Manufacturing Example 6

(Blocked Polyisocyanate Curing Agent)

A reaction vessel was filled with 270 parts of COSMONATE M-200 (trade name, manufactured by Mitsui Chemicals Corporation, crude MDI) and 127 parts of methylisobutyl ketone, and the mixture was heated to 70° C. 236 parts of ethylene glycol monobutyl ether were added dropwise to this over 1 hour, and then heated to 100° C. While maintaining this temperature, samples were taken over time to confirm that the absorption of the unreacted isocyanate group had ceased by infrared spectrophotometry, and a blocked polyisocyanate curing agent having a resin solids content of 80% was obtained.

Manufacturing Example 7

(Pigment Dispersion Resin)

696 parts of trilene diisocyanate (TDI) and 304 parts of methyl isobutyl ketoxime (MIBK) were placed in a flask and heated to 60° C. 520 parts of 2-ethylhexyl alcohol were added dropwise and reacted until the NCO value reached 110.5 to obtain a partial blocked isocyanate A having a resin content of 80%.

Next, 380 parts of the partial blocked isocyanate A was taken out, 89 parts of dimethyl ethanolamine were added dropwise at 70° C., and reacted until the mixture was practically free of NCO. After diluting with 34.75 parts of ethylene glycol monobutyl ether, the diluted mixture was neutralized with 100 parts of 90% lactic acid to obtain lactic acid-neutralized amino group-containing blocked isocyanate B at a concentration of 80%.

1125 parts of jER828EL (trade name, manufactured by Mitsubishi Chemical Corporation, epoxy resin, epoxy equivalent weight 190, a number-average molecular weight 370), 456 parts of bisphenol A and 1.1 parts of triphenylphosphonium iodide were added in another flask, and the mixture was reacted at 170° C. until the epoxy equivalent became 790, then diluted with 279 parts of MIBK, and then 760 parts of the partial blocked isocyanate A was added and the mixture was reacted at 100° C. until the mixture was practically free of NCO.

Then, 630 parts of ethylene glycol monobutyl ether were added and cooled to 80° C., 860 parts of the lactic acid neutralized amino group-containing block isocyanate B at a concentration of 80% was added, and the mixture was reacted until the acid value became 1 mg KOH/g or less, and then propylene glycol monomethyl ether was added to adjust the solids content to obtain a pigment dispersion resin solution containing a quaternary ammonium base having a solids content of 60%.

Manufacturing Example 8

(Pigment Dispersion Paste No. 1)

8.3 parts of the pigment dispersion resin solution of Manufacturing Example 7 (5 parts solids content), 14.5 parts of titanium oxide, 9.0 parts of purified clay, 0.3 parts of carbon black, and 20.3 parts of deionized water were mixed and dispersed by a ball mill for 20 hours to obtain a pigment dispersion paste No. 1 having a solids content of 55%.

Manufacturing Example 9

(Pigment Dispersion Paste No. 2)

8.3 parts of the pigment dispersion resin solution of Manufacturing Example 7 (5 parts solids content), 14.5 parts of titanium oxide, 7.0 parts of purified clay, 0.3 parts of carbon black, 1 part of dioctyltin oxide, 1 part of bismuth hydroxide, and 20.3 parts of deionized water were mixed and dispersed by a ball mill for 20 hours to obtain a pigment dispersion paste No. 2 having a solids content of 55%.

Manufacturing Example 10

(Active Hydrogen Group-Containing Epoxy Resin No. 2 (Michael Addition Reaction Donor Component))

1000 parts of jER828EL (trade name, manufactured by Mitsubishi Chemical Corporation, epoxy resin, epoxy equivalent 190, a number-average molecular weight 370), 400 parts of bisphenol A and 0.2 parts of dimethylbenzylamine were placed in a flask equipped with a stirrer, a thermometer, a nitrogen-introducing tube, and a reflux condenser, and the mixture was reacted at 130° C. until the epoxy equivalent was 850. Then, 180 parts of acetoacetic acid was added, reacted at 120° C. for 4 hours, and adjusted with ethylene glycol monobutyl ether to obtain an epoxy resin No. 2 solution having a solids content of 80%. The active hydrogen-group-containing epoxides had an amine value of 0 mg KOH/g and a weight-average molecular weight of 1,900.

Manufacturing Example 11

(Amino Group-Containing Epoxy Resin No. 2)

1200 parts of jER828EL (trade names, Mitsubishi Chemical Corporation epoxy resin, epoxy equivalent 190, a number-average molecular weight 370) were placed in a flask equipped with a stirrer, a thermometer, and a reflux condenser, 500 parts of bisphenol A and 0.2 parts of dimethylbenzylamine were added, and the mixture was reacted at 130° C. until the epoxy equivalent was 850. Then, 100 parts of diethanolamine and 214 parts of a ketiminated compound of diethylenetriamine and methyl isobutyl ketone were added, and after reacting at 120° C. for 4 hours, 480 g of ethylene glycol monobutyl ether was added to obtain an epoxy resin No. 2 solution having a solids content of 80%. Amino group-containing epoxy resin No. 2 had an amine value of 90 mg KOH/g and a weight average molecular weight of 2,000.

Manufacturing Example 12

(Amino Group-Containing Acrylic Resins)

35 parts of Propylene glycol monomethyl ether and 25 parts of propylene glycol monobutyl ether were put in a reaction vessel equipped with a thermometer, a thermostat, a stirrer, a reflux condenser, and a dropping apparatus, heated while stirring and maintained at 110° C. A mixture of 10 parts of "MPEG1000" (trade name, Methoxypolyethylene glycol monomethacrylate, Degussa Corporation, molecular weight approximately 1000), 10 parts of 4-hydroxybutyl acrylate, 20 parts of dimethylaminoethyl methacrylate, 10 parts of styrene, 30 parts of isobornyl acrylate, 10 parts of methyl methacrylate, 10 parts of n-butyl acrylate, 1 part of azobis(isobutyronitrile) and 20 parts of propylene glycol monomethyl ether were added dropwise over 3 hours. After dropping, the solution was matured at 110° C. for 30 minutes, and then an additional catalytic mixture consisting of 15 parts of propylene glycol monomethyl ether and 0.5 parts of azobis(isobutyronitrile) was added dropwise over 1 hour. After aging at 110° C. for 1 hour and cooling, an acrylic resin solution having a solids content of 50% was obtained. The amine value of the amino group containing acrylic resin was 70 mg KOH/g, and a weight average molecular weight was 20,000.

Manufacturing Example 13

(Epoxy Resin-Added Amine Catalyst No. 2 (Michael Addition Reaction Catalyst))

370 parts of jER828EL (trade name, Mitsubishi Chemical Corporation, epoxy resin, epoxy equivalent 190, a number-average molecular weight 370), 278 parts of 1,5,7-triazabicyclo[4.4.0]deca-5-ene, 500 parts of isobutyl methyl ketone were placed in a flask equipped with a stirrer, thermometer, and reflux condenser, and the mixture was heated to 120° C. and reacted for 5 hours. Then, isobutyl methyl ketone was added to adjust the solids content to obtain an amine catalyst No. 2 (Michael addition reaction catalyst) solution having a solids content of 50%.

Manufacturing Example 14

(Microencapsulated Catalyst No. 2 (Michael Addition Reaction Catalyst))

500 parts of butyl cellosolve were placed in a reaction vessel equipped with a stirrer, a thermometer, a decanter, a reflux a condenser, a nitrogen introducing tube, and a dropping funnel. The temperature was raised to 120° C. while introducing nitrogen gas, and a mixture of 100 parts of styrene, 500 parts of methyl methacrylate, 100 parts of butyl aminoethyl methacrylate, 100 parts of dimethylaminoethyl methacrylate, 200 parts of methoxy polyethylene glycol methacrylate, and 10 parts of t-butyl peroxy-2-ethylhexanoate was added dropwise over 3 hours. After dropping, the reaction was further conducted at 120° C. for 1 hour, the mixture was cooled and was adjusted with butyl cellosolve to obtain a tertiary amino group-containing acrylic resin having a solids content of 50%. The obtained resin had a Tg of 60° C. and an amine value of 35 mg KOH/g.

30 parts of the acrylic resin containing the tertiary amino group described above and 70 parts of the epoxy resin-added amine catalyst No. 2 obtained in Manufacturing Example 13 were mixed. Further, an emulsion was formed by phase change by slowly adding ion-exchanged water while stirring vigorously. A microencapsulated Catalyst No. 2 (Michael Addition Reaction Catalyst) having a solids content of 32% was obtained by evaporating the solvent under reduced pressure.

Next, Examples and Comparative Examples will be described.

In each of the Examples and Comparison Examples, after each cationic electrodeposition coating composition (without pigment, and with pigment) was prepared, an electrodeposition coating plate was produced using the cationic electrodeposition coating composition with pigment.

The reasons for the production of pigmented and non-pigmented electrodeposition coated plates are as follows. It is difficult to accurately evaluate "pigmented" samples, since the particle size of pigment particles is also measured simultaneously in the evaluation of storage stability (particle size measurement) of only the resin particles described below, In addition, it is difficult to accurately evaluate "no pigment (clear coating)" samples, since the color adhesion of gauze cannot be evaluated in the evaluations of low-temperature curability described below.

Example 1

(Cationic Electrodeposition Coating Composition No. 1-1)

50 parts of the active hydrogen group containing epoxy resin solution obtained in Manufacturing Example 1 (40 parts of solids), 10.6 parts of the amine catalytic solution obtained in Manufacturing Example 4 (5.3 parts of solids), and 3.2 parts of 10% formic acid were mixed, and the mixture was uniformly stirred. Thereafter, deionized water was slowly added dropwise while stirring vigorously to obtain emulsion particles (A) containing a Michael addition reaction donor component having a solids content of 32%.

Then, 75 parts of an α,β-unsaturated carbonyl group containing epoxy resin solution (60 parts of solids) acid obtained in Manufacturing Example 2 and 4.8 parts of 10% formic were mixed, and after uniform stirring, deionized water was slowly added dropwise while stirring vigorously to obtain emulsion particles (B) containing an Michael addition reaction acceptor component having a solids content of 32%.

141.5 parts of the emulsion particles (A) and 187.5 parts of the emulsion particles (B) were mixed to obtain a cationic electrodeposition coating composition (no pigment) No. 1-1 having a solids content of 32%.

(Cationic Electrodeposition Coating Composition No. 1-2)

Then, 52.4 parts of 55% the Pigment Dispersion Paste No. 1, (28.8 parts of solids) obtained in Manufacturing Example 8 and 289.1 parts of deionized water were mixed to the coating composition No. 1-2 above described to obtain a cationic electrodeposition coating composition No. 1-2 having a solids content of 20% (with pigment).

(Preparation of Electrodeposition Coated Plates)

Chemical treatment (trade name "Pulbond #3020"; Japan Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the above cationic electrodeposition coating composition (with pigment) No. 1-2 to make a dry film having a thickness of 15 μm, and electrodeposition coated plates (two sheets baked and dried at temperatures of 80° C. and 100° C.) were obtained by baking and drying at 80° C. and 100° C. for 20 minutes. The surface roughness values (Ra) of the coated surfaces of the resulting electrodeposition coated plates were measured with a surface roughness meter (trade name "Surf Test 301", manufactured by Mitsutoyo Corporation) with a cut-off of 0.8 mm. The surfaces had roughness values (Ra) of less than 0.25 and good finished appearances.

Example 2

(Cationic Electrodeposition Coating Composition No. 2-1)

50 parts of the active hydrogen group-containing epoxy resin solution (40 parts of solids) obtained in Manufacturing Example 1, 2 parts of 1,5-diazabicyclo[4,3,0]-nonene-5 (DBN), and 3.2 parts of 10% formic acid were mixed, and after uniform stirring, deionized water was slowly added dropwise while stirring vigorously to obtain emulsion particles (A) containing a Michael addition reaction donor component having a solids content of 32.0%.

Then, 75 parts of an α,β-unsaturated carbonyl group containing epoxy resin solution (60 parts of solids) with and 4.8 parts of 10% formic acid obtained in Manufacturing Example 2 were mixed, and after uniform stirring, deionized water was slowly added dropwise while stirring vigorously to obtain emulsion particles (B) containing a Michael addition reaction acceptor component having a solids content of 32.0%.

131.3 parts of the emulsion particles (A) and 187.5 parts of the emulsion particles (B) described above were mixed, and a cationic electrodeposition coating composition (no pigment) No. 2-1 having a solids content of 32% was obtained.

(Cationic Electrodeposition Coating Composition No. 2-2)

Then, 52.4 parts of 55% pigment dispersion paste No. 1 (28.8 parts of solids) obtained in Manufacturing Example 8, and 282.8 parts of deionized water were added to obtain a cationic electrodeposition coating composition (with pigment) No. 2-2 having a solids content of 20%.

(Preparation of Electrodeposition Coated Plates)

Chemical treatment (trade name "Pulbond #3020"; Japan Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the above cationic electrodeposition coating composition (with pigment) No. 2-2 to make a dry film having a thickness of 15 μm. Electrodeposition coated plates (two plates baked dry at 80° C. and 100° C.) were obtained by baking and drying at 80° C. and 100° C. for 20 minutes respectively. The surface of the resulting electrodeposition coated plates had surface roughness values (Ra) of less than 0.30 and a standard finished appearance.

Example 3

(Cationic Electrodeposition Coating Composition No. 3-1)

50 parts of the active hydrogen group containing epoxy resin solution (40 parts of solids) obtained in Manufacturing Example 1 and 3.2 parts of 10% formic acid were mixed, and after uniform stirring, deionized water was slowly added dropwise while stirring vigorously to obtain emulsion particles (A) containing a Michael addition reaction donor component with 32.0% of solids.

Then, 75 parts of an α,β-unsaturated carbonyl group containing epoxy resin solution (60 parts of solids) obtained in Manufacturing Example 2 with and 4.8 parts of 10% formic acid were mixed, and after uniform stirring, deionized water was slowly added dropwise while stirring vigorously to obtain an emulsion particle (B) containing the Michael addition reaction acceptor component having a solids content of 32.0%.

125 parts of the above emulsion particles (A), 187.5 parts of the emulsion particles (B), and 23.3 parts of the microencapsulated catalyst obtained in Manufacturing Example 5 were mixed to obtain a cationic electrodeposition coating composition (no pigment) No. 3-1 having a solids content of 32%.

(Cationic Electrodeposition Coating Composition No. 3-2)

Then, 52.4 parts of the 55% pigment dispersion paste No. 1 (28.8 parts of solids) obtained in Manufacturing Example 8, and 293.3 parts of deionized water were added to cationic electrodeposition coating composition No. 3-1 to obtain a cationic electrodeposition coating composition (with pigment) No. 3-2 having a solids content of 20%.

(Preparation of Electrodeposited Coating Plates)

Chemical treatment (trade name "Pulbond #3020"; Nihon Percalizing Co., Ltd., zinc phosphate treatment agent) was applied to cold-rolled steel plates (150 mm (long×70 mm (wide)×0.8 mm (thick)) as a coating substrate. Electrodeposition coating was performed using the cationic electrodeposition coating composition (with pigment) No. 3-2 to make a dry film having a thickness of 15 μm. Electrodeposition coating was baked and dried at 80° C. and 100° C. for 20 minutes respectively to obtain electrodeposition coating plates (two sheets baked dry 80° C. and 100° C.) with good finished appearances.

Example 4

(Cationic Electrodeposition Coating Composition No. 4-1)

81 parts of the active hydrogen group-containing epoxy resin No. 2 solution (65 parts of solids) obtained in Manufacturing Example 10, 12 parts of the amino group-containing acrylic resin solution (6 parts of solids) obtained in Manufacturing Example 12, and 3.2 parts of 10% formic acid were mixed, and after uniform stirring, deionized water was slowly added dropwise while stirring vigorously to obtain emulsion particles (A) containing a Michael addition reaction donor component having a solids content of 32%.

Then, 25 parts of EBECRYL450 (trade name, polyester acrylate with an average of 6 acrylate functional groups per molecule, average molecular weight: about 620), 8 parts of the amino group-containing acrylic resin (4 parts of solids) of Manufacturing Example 12, and 3.2 parts of 10% formic acid were mixed, and after uniform stirring, deionized water was added dropwise slowly while stirring vigorously to obtain emulsion particles (B) containing a Michael addition reaction acceptor component having a solids content of 32%.

221.9 parts of the emulsion particles (A), 90.6 parts of the emulsion particles (B) described above and 23.3 parts of the microencapsulated catalyst No. 2 of Manufacturing Example 14 were mixed to obtain a cationic electrodeposition coating composition (no pigment) No. 4-1 having a solids content of 32%.

(Cationic Electrodeposition Coating Composition No. 4-2)

Then, 52.4 parts of 55% Pigment Dispersion Paste No. 1 (28.8 parts of solids) obtained in Manufacturing Example 8 and 289.1 parts of deionized water were added to the coating composition No. 4-1 described above to obtain a cationic electrodeposition coating composition No. 4-2 having a solids content of 20%.

(Preparation of Electrodeposition Coated Plates)

Chemical treatment (trade name "Pulbond #3020"; Nihon Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the cationic electrodeposition coating composition (with pigment) No. 4-2 to make a dry film having a thickness of 15 μm. The electrodeposition coating was baked and dried at 80° C. and 100° C. for 20 minutes respectively to obtain an electrodeposition coating plates with good finished appearances (two sheets baked dry at 80° C. and 100° C.).

Example 5

(Cationic Electrodeposition Coating Composition No. 5-1)

81 parts of the active hydrogen group-containing epoxy resin No. 2 solution (65 parts of solids) obtained in Manufacturing Example 10, 12 parts of the amino group-containing acrylic resin solution (6 parts of solids) obtained in Manufacturing Example 12, and 3.2 parts of 10% formic acid were mixed, and after uniform stirring, deionized water was slowly added dropwise while stirring vigorously to obtain emulsion particles (A) containing a Michael addition reaction donor component having a solids content of 32%.

Subsequently, 25 parts of EBECRYL450 (trade name, polyester acrylate having an acrylate functional group averaging 6 per molecule, a weight average molecular weight: about 1600), 10.6 parts of the epoxy-resin addition amine catalyst (5.3 parts of solids) of Production Example 13, 8 parts of the amino-group-containing acrylic resin solution (4 parts solids) of Production Example 12, and 3.2 parts of 10% formic acid were blended, and after uniform stirring, deionized water was slowly added dropwise while stirring vigorously to obtain emulsion particles (B) containing a Michael addition reaction acceptor component having a solids content of 32%.

221.9 parts of the above emulsion particles (A) and 107.2 parts of the emulsion particles (B) were mixed to obtain a cationic electrodeposition coating composition (no pigment) No. 5-1 with a solids content of 32%.
(Cationic Electrodeposition Coating Composition No. 5-2)

Then, 2.4 parts of 55% Pigment Dispersion Paste No. 5-1 (28.8 parts of solids) obtained in Manufacturing Example 8 and 289.1 part deionized water were added to the Coating Composition No. 5-1 to obtain a cationic electrodeposition coating composition (with pigment) No. 5-2 having a solids content of 20%.
(Preparation of Electrodeposited Coated Plates)

Chemical treatment (trade name "Pulbond #3020"; Japan Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the cationic electrodeposit coating composition (with pigment) No. 5-2 to make a dry film having a thickness of 15 μm. The coated steel plates were baked and dried at 80° C. and 100° C. for 20 minutes respectively to obtain electrodeposition coated plates (two sheets baked dry at 80° C. and 100° C.) with good finished appearances.

Example 6

(Cationic Electrodeposition Coating Composition No. 6-1)

87.5 parts of the amino group-containing epoxy resin No. 2 solution (60 parts solids) obtained in Manufacturing Example 11, and 3.2 parts of 10% formic acid were mixed, and after uniform stirring, deionized water was slowly added dropwise while stirring vigorously to obtain emulsion particles (A) containing a Michael addition reaction donor component having a solids content of 32%.

Then, 35 parts of epoxy ester 3002A (trade name, Kyoei Chemical Co., Ltd., acrylic acid adduct of bisphenol A propylene oxide adduct diglycidyl ether, a weight-average molecular weight: approximately 1600), 10 parts of an amino group containing acrylic resin solution (5 parts of solids) of Manufacturing Example 12, and 3.2 parts of 10% formic acid were mixed, and after uniform stirring, deionized water was added dropwise slowly while stirring vigorously to obtain emulsion particles B containing a Michael addition reaction acceptor component having a solids content of 32%.

187.5 parts of the above emulsion particle (A), 125 parts of the emulsion particle (B) and 23.3 parts of the microencapsulated catalyst No. 2 of Manufacturing Example 14 were mixed to obtain a cationic electrodeposition coating composition (no pigment) No. 6-1 having a solids content of 32%.
(Cationic Electrodeposition Coating Composition No. 6-2)

Then, 52.4 parts of 55% Pigment Dispersion Paste No. 1, (28.8 parts of solids) obtained in Manufacturing Example 8 and 289.1 part of deionized water were added to the above Coating Composition No. 6-1 to obtain a cationic electrodeposition coating composition (with Pigment) No. 6-2 having a solids content of 20%.
(Preparation of Electrodeposited Coating Plates)

Chemical treatment (trade name "Pulbond #3020"; Nihon Percalizing Co., Ltd., zinc phosphate treatment agent) was applied to (cold-rolled steel plates (150 mm (long)×70 mm (wide)×0.8 mm (thick)) as a coating substrate. Electrodeposition coating was performed using the cationic electrodeposit coating composition (with pigment) No. 9-2 to make a dry film having a thickness of 15 μm. The coated steel plates were baked and dried at 80° C. and 100° C. for 20 minutes respectively to obtain an electrodeposition coated plates (two sheets baked dry at 80° C. and 100° C.) with good finished appearances.

Comparative Example 1

(Cationic Electrodeposition Coating Composition No. 7-1)

50 parts of the active hydrogen group containing epoxy resin solution (40 parts solids) obtained in Preparation Example 1 and 3.2 parts of 10% formic acid were mixed, and after uniform stirring, deionized water was slowly added dropwise while stirring vigorously to obtain emulsion particles (A) containing a Michael addition reaction donor component having a solids content of 32.0%.

Then, 75 parts (60 parts solids) of epoxy resin with an α,β-unsaturated carbonyl group obtained in Manufacturing Example 2 and 4.8 parts of 10% formic acid were mixed, and after uniform stirring, deionized water was slowly added dropwise while stirring vigorously to obtain emulsion particles (B) containing an acceptor component of Michael addition reaction having a solids content of 32.0%.

125 parts of the above emulsion particles (A) and 187.5 parts of the emulsion particles (B) were mixed, and then a mixture of 2 parts of 1,5-diazabicyclo [4,3,0]-nonene-(DBN) and 1 part of EMULGEN 707 (trade name, Kao Co., Ltd., nonionic surfactant) was added to obtain a cationic electrodeposition coating composition (no pigment) No. 7-1 having a solids content of 32%.
(Cationic Electrodeposition Coating Composition No. 7-2)

Then, 52.4 parts of 55% pigment dispersion paste No. 1 (28.8 parts solids) obtained in Manufacturing Example 8 and 282.8 parts of deionized water were added to the cationic electrodeposition coating composition No. 7-1 to obtain a cationic electrodeposition coating composition (with pigment) No. 7-2 having a solids content of 20%.
(Preparation of Electrodeposited Coating Plates)

Chemical treatment (trade name "Pulbond #3020"; Nihon Percalizing Co., Ltd., zinc phosphate treatment agent) was applied to cold-rolled steel plates (150 mm (long)×70 mm (wide)×0.8 mm (thick)) as a coating substrate. Electrodeposition coating was performed with the cationic electrodeposition coating composition (with pigment) No. 7-2 to make a dry film having a thickness of 15 μm. The coated steel plates were baked and dried at 80° C. and 100° C. for 20 minutes respectively to obtain electrodeposition coated plates (two sheets baked dry at 80° C. and 100° C.).

Comparative Example 2

(Cationic Electrodeposition Coating Composition No. 8-1)

50 parts of the active hydrogen group containing epoxy resin solution (40 parts of solids) obtained in Preparation Example 1 and 3.2 parts of 10% formic acid were mixed, and after uniform stirring, deionized water was slowly added dropwise while stirring vigorously to obtain emulsion particles (A) containing a Michael addition reaction donor component having a solids content of 32.0%.

Then, 75 parts of the α,β-unsaturated carbonyl group containing epoxy resin (60 parts of solids) obtained in Manufacturing Example 2 and 4.8 parts of 10% formic acid were mixed, and after uniform stirring, deionized water was slowly added dropwise while stirring vigorously to obtain emulsion particles (B) containing a Michael addition reaction acceptor component having a solids content of 32.0%.

125 parts of the above emulsion particles (A) and 187.5 parts of the emulsion particles (B) were mixed to obtain a cationic electrodeposition coating composition (no pigment) No. 8-1 having a solids content of 32%.
(Cationic Electrodeposition Coating Composition No. 8-2)

Then, 52.4 parts of 55% pigment dispersion paste No. 1 (28.8 parts of solids) obtained in Manufacturing Example 8 and 282.8 parts of deionized water were added to the cationic electrodeposition coating composition No. 8-1 to obtain a cationic electrodeposition coating composition (with pigment) No. 8-2 having a solids content of 20%.
(Preparation of Electrodeposited Coating Plates)

Chemical treatment (trade name "Pulbond #3020"; Nihon Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the cationic electrodeposition coating composition (with pigment) No. 8-2 to make a dry film having a thickness of 15 μm. Electrodeposition coating was baked and dried at 80° C. and 100° C. for 20 minutes respectively to obtain an electrodeposition coated plates (two sheets baked dry at 80° C. and 100° C.) with good finished appearance.

Comparative Example 3

(Cationic Electrodeposition Coating Composition No. 9-1)

87.5 parts of the amino group-containing epoxy resin solution (70 parts of solids) obtained in Manufacturing Example 3 and 37.5 parts (30 parts solids) of the blocked polyisocyanate curing agent obtained in Manufacturing Example 6 were mixed, further mixed with 13 parts of 10% acetic acid, and uniformly stirred. Then, 174.5 parts of deionized water were added dropwise over about 15 minutes while stirring vigorously to obtain a cationic electrodeposition coating composition (no pigment) No. 9-1 having a solids content of 32%.
(Cationic Electrodeposition Coating Composition No. 9-2)

Then, 52.4 parts of 55% pigment dispersion paste No. 2 (28.8 parts of solids) obtained in Manufacturing Example 9 and 279.1 parts deionized water were added to 312.5 parts of the above cationic electrodeposition coating composition No. 9-1 (100 parts solids) to obtain a cationic electrodeposition coating composition (with pigment) No. 9-2 having a solids content of 20%.
(Preparation of Electrodeposited Coating Plates)

Chemical treatment (trade name "Pulbond #3020"; Nihon Percalizing Co., Ltd., zinc phosphate treatment agent) was applied to cold-rolled steel plates (150 mm (long)×70 mm (wide)×0.8 mm (thick)) as a coating substrate. Electrodeposition coating was performed using the above cationic electrodeposit coating composition (with pigment) No. 9-2 to make a dry film having a thickness of 15 μm. The coated steel plates were baked and dried at 80° C. and 100° C. for 20 minutes respectively to obtain electrodeposit coated plates (two sheets baked dry at 80° C. and 100° C.) with good finished appearances.

The cationic electrodeposition coating compositions (no pigment, with pigment) obtained in the above examples and comparative examples were evaluated by the evaluation tests described below. The results are shown in Table 1 and Table 2.

If at least one of the two evaluation tests failed with a result of "D", the coating is considered to be a failure. Evaluations were conducted with pigmented or non-pigmented coatings, but if either failed with a result of "D", all coating in the series were considered to be failures.

Evaluation Tests

<Storage Stability>

The particle size changes before and after storage of the cationic electrodeposition coating compositions (no pigment) obtained in the examples and comparative examples were compared after storage for 1 month at a temperature of 30° C.

"COULTER N4 type" (trade name, manufactured by Beckman Coulter K. K.) was used to measure the particle size. As for the evaluation, A to C pass, and D fails.
A: The average particle size after storage is less than +10% based on the average particle size before storage.
B: The average particle size after storage is +10% or more and less than +20% based on the average particle size before storage.
C: The average particle size after storage is +20% or more and less than +40% based on the average particle size before storage.
D: The average particle size after storage is +40% or more based on the average particle size before storage.
<Low-Temperature Curability>

The cationic electrodeposition coating compositions obtained in the examples and comparative examples (with pigments) were applied on glass plates in an applicator such that the thickness of dry coatings was 15 μm, and heated at 120° C. for 30 minutes. Then, rubbing treatment was performed by reciprocating five times with a load of 500 g using gauze impregnated with acetone. Low-temperature curability was evaluated by assessing the status of the gauze and the coatings according to the following criteria. As for the evaluation, A to C pass, and D fails.
A: Exposure of the substrate and transfer of the pigment to the gauze are not observed at all.
B: Exposure of the substrate cannot be confirmed, but transfer of the pigment to the gauze is slightly confirmed.
C: Exposure of the substrate is not confirmed, but the transfer of the pigment to the gauze is somewhat confirmed.
D: Transfer of the pigment to the gauze is remarkable, and exposure of the substrate is confirmed.

TABLE 1

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Cationic Electrodeposition Composition (no pigment) | No. 1-1 | No. 2-1 | No. 3-1 | No. 4-1 | No. 5-1 | No. 6-1 | No. 7-1 | No. 8-1 | No. 9-1 |
| storage stability | B | C | A | A | A | C | D | A | A |

TABLE 2

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Cationic Electrodeposition Composition (with pigment) | No. 1-1 | No. 2-2 | No. 3-2 | No. 4-2 | No. 5-2 | No. 6-2 | No. 7-2 | No. 8-2 | No. 9-2 |
| low-temperature curability | A | A | B | A | A | A | C | D | D |

The invention claimed is:

1. A cationic electrodeposition coating composition comprising:
a first emulsion particle (A) containing a Michael addition reaction donor component and a second emulsion particle (B) containing a Michael addition reaction acceptor component,
wherein the Michael addition reaction donor component is an active hydrogen group-containing compound whose skeleton is a resin,
wherein the first emulsion particle (A) and the second emulsion particle (B) are present separately in the cationic electrodeposition coating composition, and
wherein a Michael addition reaction catalyst (C) is contained in the first emulsion particle (A) or the second emulsion particle (B) or is contained in the cationic electrodeposition coating composition by being microencapsulated.

2. The cationic electrodeposition coating composition according to claim 1,
wherein the active hydrogen group-containing compound whose skeleton is a resin is an epoxy resin having an amino group with a molecular weight of 1000 to 50000, and
wherein the Michael addition reaction donor component of the first emulsion particle (A) is at least one active hydroxyl group-containing compound (A-1) selected from the group consisting of an active methylene group-containing compound, a primary and/or secondary amine group-containing compound, a thiol group (mercapto group) containing compound, and a hydrogen group-containing compound.

3. The cationic electrodeposition coating composition according to claim 1, wherein the Michael addition reaction donor component of the first emulsion particle (A) is a compound having an active methylene group, and wherein the compound having the active methylene group is at least one compound selected from the group consisting of a malonic acid compound, an acetoacetic acid compound, an isobutyrylacetic acid compound, a benzoylacetic acid compound, and a propionylacetic acid compound.

4. The cationic electrodeposition coating composition according to claim 1, wherein the Michael addition reaction acceptor component of the second emulsion particle (B) is at least one compound (B-1) having an α,β-unsaturated carbonyl group selected from the group consisting of a (meth)acryloyloxy group-containing compound, a (meth)acrylamide group-containing compound, a maleic acid compound, a fumaric acid compound, and an itaconic acid compound.

5. The cationic electrodeposition coating composition according to claim 2, wherein the Michael addition reaction acceptor component of the second emulsion particle (B) is at least one compound (B-1) having an α,β-unsaturated carbonyl group selected from the group consisting of a (meth)acryloyloxy group-containing compound, a (meth)acrylamide group-containing compound, a maleic acid compound, a fumaric acid compound, and an itaconic acid compound.

6. The cationic electrodeposition coating composition according to claim 1, wherein the Michael addition reaction catalyst (C) is at least one basic catalyst selected from the group consisting of an alkali metal hydroxide, an alkali metal carbonate, a quaternary ammonium compound, a tertiary ammonium compound, a guanidine compound, an amidine compound, a tertiary phosphine compound, a phosphazene compound, a tertiary sulfonium compound, a quaternary phosphonium compound, and an imidazole compound.

7. The cationic electrodeposition coating composition according to claim 6, wherein the basic catalyst has a molecular weight of 200 or more.

8. The cationic electrodeposition coating composition according to claim 1, wherein when the cationic electrodeposition coating composition is centrifuged under the following conditions to separate into a solid component and a solvent component, the content of the Michael addition reaction catalyst (C) contained in the solvent component is 30% by mass or less based on an blending quantity of the Michael addition reaction catalyst (C) in the cationic electrodeposition coating composition;
<Centrifugation conditions>
the cationic electrodeposition composition is centrifuged at 25° C. and a relative centrifugal acceleration of $3.5 \times 10^4$ G for 5 hours.

9. The cationic electrodeposition coating composition according to claim 1, wherein a pigment is contained in at least one of the first emulsion particle (A) containing the Michael addition reaction donor component and the second emulsion particle (B) containing the Michael addition reaction acceptor component.

10. The cationic electrodeposition coating composition according to claim 5, wherein one of the compound containing the active hydrogen group (A-1) and the compound having α,β-unsaturated carbonyl group (B-1) is an epoxy resin having a weight-average molecular weight of 1,800 or more, and the other is a compound having a weight-average molecular weight of less than 1,800.

11. The cationic electrodeposition coating composition according to claim 1, wherein the Michael addition reaction catalyst (C) is a microencapsulated catalyst.

12. The cationic electrodeposition coating composition according to claim 1, wherein the Michael addition reaction catalyst (C) is a temperature sensitive microencapsulated catalyst and elutes at a temperature between 30° C. and 130° C.

13. A method for electrodeposition coating comprising:
immersing a metal substrate in an electrodeposition coating bath to electrodeposit on the substrate by using the cationic electrodeposition coating composition according to claim 1 as the electrodeposition coating bath.

14. A method for electrodeposition coating comprising:
immersing a metal substrate in an electrodeposition coating bath by using the cationic electrodeposition coating composition according to claim 1 as the electrodeposition coating bath, and curing at a temperature of 130° C. or less after conducting electrodeposition coating.

15. A method for electrodeposition coating comprising:
immersing a metal substrate in an electrodeposition coating bath by using the cationic electrodeposition coating composition according to claim 1 as the electrodeposition coating bath, and curing by electromagnetic induction heating after conducting electrodeposition coating.

* * * * *